United States Patent
Kasai et al.

(10) Patent No.: US 11,753,312 B2
(45) Date of Patent: Sep. 12, 2023

(54) WATER QUALITY MANAGEMENT APPARATUS AND METHOD FOR AQUACULTURE POND

(71) Applicants: KASAI CORPORATION, Niigata (JP); REX INDUSTRIES CO., LTD., Osaka (JP)

(72) Inventors: Shinichi Kasai, Niigata (JP); Masaru Oshiro, Niigata (JP); Toshitaka Fukuda, Niigata (JP); Tomoyuki Endo, Higashiosaka (JP); Yusuke Fujii, Higashiosaka (JP); Koichi Imakubo, Higashiosaka (JP)

(73) Assignees: KASAI CORPORATION, Niigata (JP); REX INDUSTRIES CO., LTD., Osaka (JP)

( * ) Notice: Subject to any disclaimer, the term of this patent is extended or adjusted under 35 U.S.C. 154(b) by 0 days.

(21) Appl. No.: 17/633,995

(22) PCT Filed: Aug. 13, 2020

(86) PCT No.: PCT/JP2020/030822
§ 371 (c)(1),
(2) Date: Feb. 9, 2022

(87) PCT Pub. No.: WO2021/033627
PCT Pub. Date: Feb. 25, 2021

(65) Prior Publication Data
US 2022/0267168 A1     Aug. 25, 2022

(30) Foreign Application Priority Data
Aug. 20, 2019   (JP) ................. 2019-150548

(51) Int. Cl.
*C02F 1/00*        (2023.01)
*A01K 63/04*       (2006.01)
(Continued)

(52) U.S. Cl.
CPC .............. *C02F 1/008* (2013.01); *A01K 63/04* (2013.01); *C02F 1/66* (2013.01); *C02F 2103/20* (2013.01);
(Continued)

(58) Field of Classification Search
None
See application file for complete search history.

(56) References Cited

U.S. PATENT DOCUMENTS

| 2001/0022135 | A1 | 9/2001 | Murai | |
| 2006/0169646 | A1* | 8/2006 | Andree | C02F 1/008 210/749 |

(Continued)

FOREIGN PATENT DOCUMENTS

| CN | 102183621 A | 9/2011 |
| CN | 103018418 A | 4/2013 |

(Continued)

*Primary Examiner* — Richard C Gurtowski
(74) *Attorney, Agent, or Firm* — Finnegan, Henderson, Farabow, Garrett & Dunner, LLP

(57) ABSTRACT

Provided is a water quality management apparatus for an aquaculture pond, the apparatus having a storage unit for storing water quality-related measured values measured at appropriate time intervals by external sensors set in the aquaculture pond, an assessment unit for calculating a predicted future value on the basis of fluctuations in the measured values and determining the time when the predicted value will exceed a reference value that indicates deterioration of water quality, and a display unit for displaying the time when the reference value will be exceeded. Said time is the time when exchange of pond water will be necessary.

6 Claims, 6 Drawing Sheets

(51) Int. Cl.
   *C02F 1/66*   (2023.01)
   *C02F 103/20*   (2006.01)
(52) U.S. Cl.
   CPC ...... *C02F 2209/04* (2013.01); *C02F 2209/05* (2013.01); *C02F 2209/06* (2013.01); *C02F 2209/14* (2013.01); *C02F 2209/22* (2013.01)

(56) References Cited

U.S. PATENT DOCUMENTS

| 2010/0099193 | A1* | 4/2010 | Hsu | G01N 33/18 |
| | | | | 702/182 |
| 2014/0231360 | A1* | 8/2014 | Poole | C02F 3/006 |
| | | | | 210/96.1 |
| 2019/0071336 | A1* | 3/2019 | Greenwald | A01K 61/13 |

FOREIGN PATENT DOCUMENTS

| CN | 203101372 U | 7/2013 |
| CN | 105701280 A | 6/2016 |
| CN | 106292802 A | 1/2017 |
| CN | 108665106 A | 10/2018 |
| CN | 108668962 A | 10/2018 |
| CN | 108710974 A | 10/2018 |
| CN | 109583663 A | 4/2019 |
| CN | 110334926 A | 10/2019 |
| JP | H3-258385 A | 11/1991 |
| JP | 2000-166421 A | 6/2000 |
| JP | 2001-248794 A | 9/2001 |
| JP | 2007-89566 A | 4/2007 |
| JP | 2010-94121 A | 4/2010 |
| JP | 4966905 B2 | 7/2012 |
| JP | 2015-19647 A | 2/2015 |
| JP | 2016-129514 A | 7/2016 |
| JP | 2017-63667 A | 4/2017 |
| JP | 2017-116561 A | 6/2017 |
| JP | 2018-033418 A | 3/2018 |
| JP | 2018-506108 A | 3/2018 |
| WO | WO 2016/110753 A1 | 7/2016 |

\* cited by examiner

FIG. 4
(A)
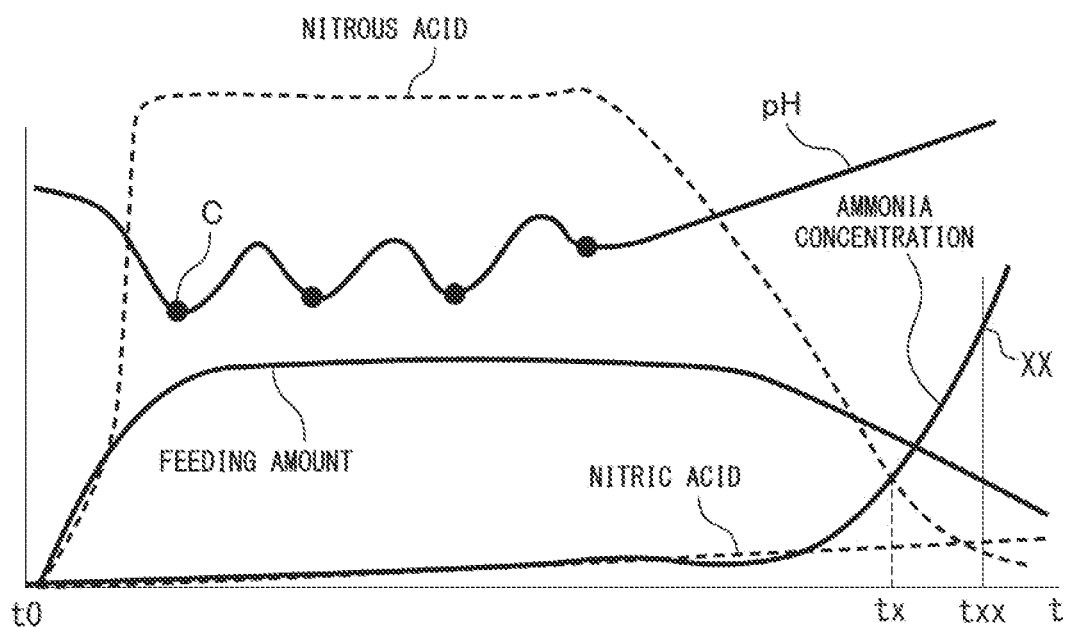
(B)
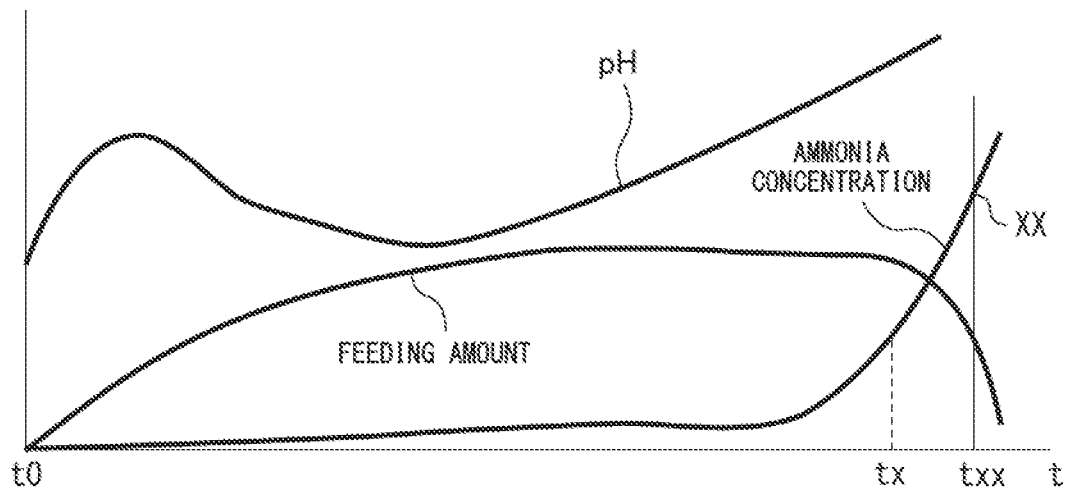

WATER QUALITY MANAGEMENT APPARATUS AND METHOD FOR AQUACULTURE POND

CROSS-REFERENCE TO RELATED APPLICATIONS

This application is a national phase application of International Application No. PCT/JP2020/030822, filed Aug. 13, 2020, and claims the priority of Japanese Application No. 2019-150548, filed Aug. 20, 2019, the contents of both of which are incorporated herein by reference.

FIELD

The present invention relates to an aquaculture pond water quality management device and method.

BACKGROUND

Regarding aquaculture pond water quality management, aquaculture pond water quality evaluation methods are known, as illustrated in Patent Literature 1. This water quality evaluation method utilizes oxidation-reduction potential as an index for evaluating water quality in carp farming, and provides a water quality evaluation method and a water quality inspection table for maintaining the health of the carp. However, this method simply determines the current water quality using the oxidation-reduction potential as an index and does not grasp the future water quality deterioration tendency and notify the pond water replacement time in advance. Furthermore, this method is applied to the special case of an aquaculture pond made of concrete, which cannot be easily applied to a natural aquaculture pond surrounded by soil because the water quality conditions are different.

Aquaculture pondwater quality purification systems are also known, as illustrated in Patent Literature 2. This water quality purification system monitors a plurality of aquaculture ponds and selects the one with the worst water quality and performs purification. However, like Patent Literature 1, the future water quality deterioration tendency is not taken into account and the pond water replacement time is not notified in advance.

As described above, though water quality evaluation methods for concrete aquaculture pond and aquaculture pond water quality purification systems have been known, there are no known systems for grasping the water quality deterioration tendency of an aquaculture pond and notifying the replacement time of the pond water in advance.

Thus, grasping the future water quality deterioration tendency of an aquaculture pond is difficult, and conventionally, gasping of future water quality degradation tendency of an aquaculture ponds depended on the intuition and experience of a specialist (craftsman) managing the aquaculture pond. Furthermore, depending on environmental conditions, the water quality of the aquaculture pond may deteriorate rapidly, and it was not possible to efficiently replace the water in the pond and clean the aquaculture pond.

As a technology related to water quality management other than for aquaculture ponds, Patent Literature 3 discloses a water quality monitoring system for an aquarium. This system is a water quality monitoring system for ornamental fish aquariums in ordinary households, and can notify the deterioration of water quality with an alarm. Furthermore, Patent Literature 4 discloses a water quality monitoring system for aquariums which can issue an alarm when the water quality of a farmed fish aquarium deviates from a normal range. However, the water quality monitoring systems of Patent Literature 3 and 4 do not notify the water replacement time in advance. The target fish scale, water quality environment, etc., are completely different between aquariums and aquaculture ponds, and it is considered unnecessary to notify the water replacement time in advance in these aquarium monitoring systems.

As described above, though evaluating aquaculture pond water quality, devices which perform water quality purification, and aquarium water quality monitoring systems have been known, there are no technologies or devices for notifying in advance the time when replacement of pond water is necessary by accurately gasping environmental conditions of the aquaculture pond and predicting the tendency of the water quality deterioration of the pond.

CITATION LIST

Patent Literature

[PTL 1] Japanese Unexamined Patent Publication (Kokai) No. 2017-116561
[PTL 2] Japanese Unexamined Patent Publication (Kokai) No. 2018-33418
[PTL 3] Chinese Utility Model Publication No. 203101372
[PTL 4] Japanese Unexamined PCT Publication (Kohyo) No. 2018-506108

SUMMARY

Technical Problem

The present invention aims to provide a device or method which, regarding water quality management of an aquaculture pond, accurately grasps environmental conditions of the pond based on fluctuations of various water quality values, predicts the water quality deterioration tendency of the pond, and notifies such deterioration in advance.

Solution to Problem

In order to achieve the above object, the aquaculture pond water quality management device according to the present invention comprises a memory unit which stores measurement values related to water quality measured at appropriate time intervals by an external sensor installed in an aquaculture pond, a determination unit which calculates a future predicted value based on fluctuations in the measurement values and determines a time when the predicted value will exceed a reference value indicating a deterioration in water quality, and a display unit which displays the time when the reference value will be exceeded, wherein the time is a time when replacement of water of the pond is necessary.

According to the aquaculture pond water quality management device according to the present invention, it is possible to accurately grasp environmental conditions of the pond based on fluctuation values related to the water quality of the aquaculture pond, predict the tendency of the water quality deterioration of the pond, and notify such deterioration in advance.

In the present invention, measurement by the external sensor rtzay be performed once daily at a fixed time.

By performing measurement at a fixed time every day, for example, before feeding once a day or before one of a plurality of feedings per day, accurate measurement is possible without being influenced by fluctuations within a day, 24 hours, and ur particular, before and after feeding.

In the present invention, the determination unit may calculate the predicted value by a statistical method and determine the time when replacement of water of the pond is necessary.

By performing analysis using a known statistical method, the determination unit can make an accurate prediction based on the measurement values.

In the present invention, the determination unit may predict a time point at which slope of the predicted value calculated based on the measurement value with respect to a time axis becomes equal to or greater than a predetermined value or equal to or less than a predetermined value and may determine the time when the reference value will be exceeded.

The determination unit predicts when the slope of the predicted value calculated based on the measurement value with respect to the time axis becomes greater than or equal to a predetermined value or less than or equal to a predetermined value, whereby accurate prediction is possible.

In the present invention, the external sensor may be an ammonia sensor and the measurement value may be ammonia concentration.

By using an ammonia sensor as the external sensor, the time when replacement of water of the pond is necessary can be determined based on ammonia concentration.

In the present invention, the external sensor may be a pH sensor and the measurement value may be hydrogen ion concentration (pH).

By using a pH sensor as the external sensor, the time when replacement of water of the pond is necessary can be determined based on hydrogen ion concentration (pH).

In the present invention, the external sensor may be an oxidation reduction potentiometer and the measurement value may be oxidation-reduction potential (ORP).

By using an oxidation reduction potentiometer as the external sensor, the time when replacement of water of the pond is necessary can be determined based on oxidation-reduction potential (ORP).

In the present invention, the external sensor may be an electrical conductivity meter and the measurement value may be electrical conductivity (EC).

By using an electrical conductivity meter as the external sensor, the time when replacement of water of the pond is necessary can be determined based on electrical conductivity (EC).

In the present invention, the external sensor may be a dissolved oxygen concentration sensor and the measurement value may be dissolved oxygen concentration (DO).

By using a dissolved oxygen concentration sensor as the external sensor, the time when replacement of water in the pond is necessary can be determined based on dissolved oxygen concentration (DO).

In the aquaculture pond water quality management device according to the present invention, two or more of an ammonia sensor, a pH sensor, an oxidation reduction potentiometer, an electrical conductivity meter, and a dissolved oxygen concentration sensor may be used as the external sensor, and the time when a reference value representing water quality deterioration will be exceeded may be determined based on two or more of an ammonia concentration, a hydrogen ion concentration (pH), an oxidation-reduction potential (ORP), an electrical conductivity (EC), and a dissolved oxygen concentration (DO) received as the measurement value. By using two or more measurement values, the determination unit can perform accurate determination based on the measurement values.

Further, the aquaculture pond water quality management method according to the present invention comprises the steps of storing measurement values related to water quality measured at appropriate time intervals by an external sensor installed in an aquaculture pond in a memory unit, calculating, by a determination unit, a future predicted value based on fluctuations in the measurement values and determining a time when the predicted value will exceed a reference value indicating a deterioration in water quality, and displaying the time when the reference value will be exceeded on a display unit, wherein the time is a time when replacement of water of the pond is necessary.

In the aquaculture pond water quality management method according to the present invention, the external sensor may be at least one of an ammonia sensor, a pH sensor, an oxidation reduction potentiometer, an electrical conductivity meter, and a dissolved oxygen concentration sensor, and the measurement value may be at least one of an ammonia concentration, a hydrogen ion concentration (pH), an oxidation-reduction potential (ORP), an electrical conductivity (EC), and a dissolved oxygen concentration (DO).

Advantageous Effects of Invention

According to the present invention, by notifying the deterioration tendency of the aquaculture pond in advance, maintenance of the aquaculture pond can be performed without waste.

According to the present invention, by ensuring appropriate water quality for breeding on a daily basis, it is possible to prevent mortality of farmed fish and to breed farmed fish effectively and economically. Furthermore, it is possible to accumulate data representing "optimal breeding methods", which are know-how in finned fish, by comparing the management method which has been dependent on the intuition and experience of a craftsman with fluctuations of water quality.

Cleaning of an aquaculture pond involves the removal of residual food and excrement accumulated in the filtration tank. Though water replacement is always performed, when cleaning is performed, the water in the filtration tank is almost entirely drained, and a large amount of water is lost. According to the present invention, energy loss and economic loss due to mass replacement of water can be reduced since if is possible to prevent significant degradation of water quality due to the operation mentioned above.

BRIEF DESCRIPTION OF DRAWINGS

FIG. 4 shows graphs illustrating fluctuations in pH and fluctuations in ammonia concentration in different breeding methods in relation to Examples 1 and 2 of the present invention.

DESCRIPTION OF EMBODIMENTS

Figure 1:
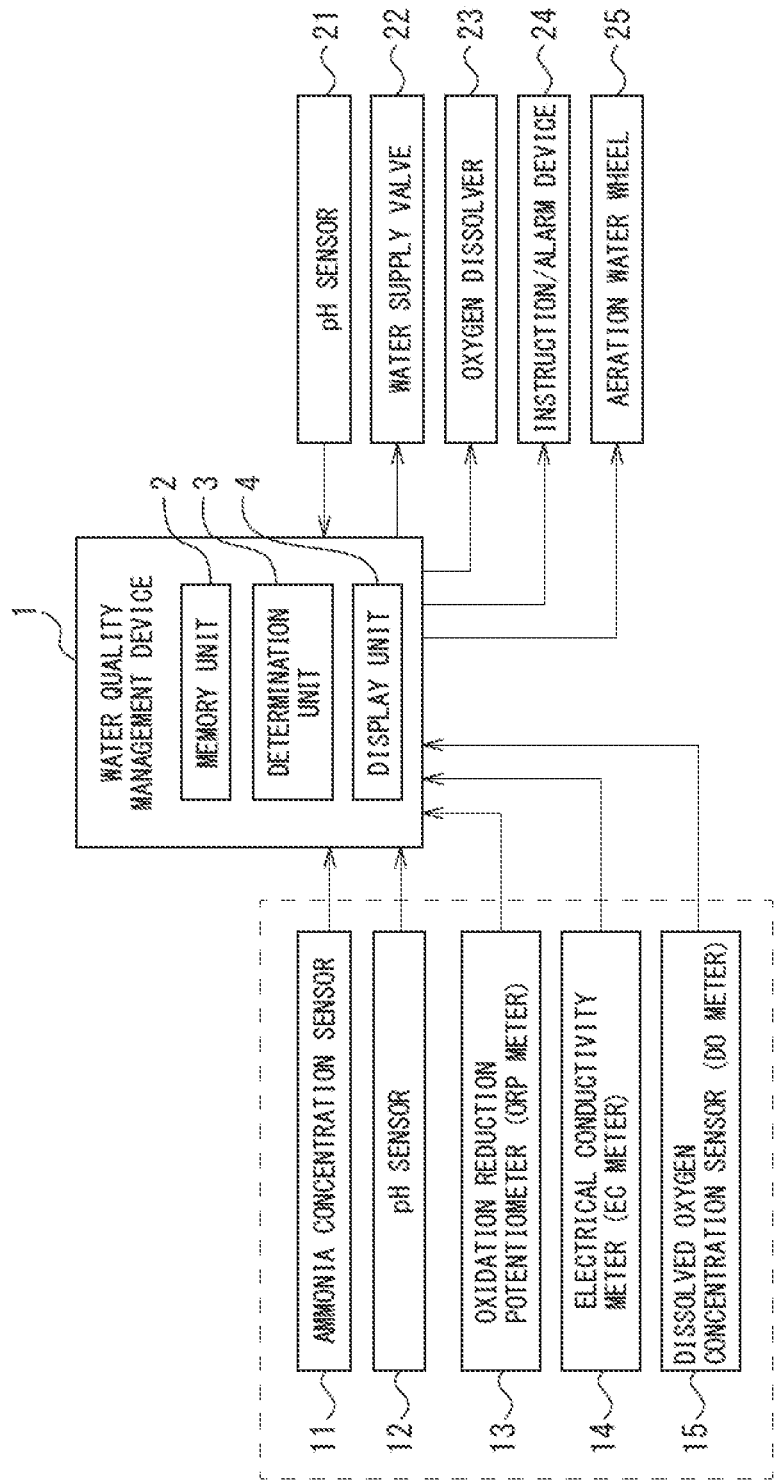
FIG. 1 is a schematic view showing an overall structure including the water quality management device according to the present invention and the facility of an aquaculture pond.

FIG. 1 is a schematic view showing an overall structure including the aquaculture pond water quality management device according to the present invention and the facility of an aquaculture pond. The water quality management device 1 comprises a memory unit 2, a determination unit 3, and a display unit 4. As external sensors 11 to 15, an ammonia concentration sensor 11, a pH sensor 12, an oxidation reduction potentiometer (ORP meter) 13, an electrical conductivity meter (EC meter) 14, and a dissolved oxygen concentration sensor (DO meter, dissolved oxygen sensor) 1 are installed in the aquaculture pond. Note that though five external sensors 11 to 15 are illustrated in FIG. 1, as described in the Examples below, it is not necessary that all of these sensors be installed in the aquaculture pond, and it is sufficient that at least one external sensor be installed.

Each of the external sensors 11 to 15 is connected to the water quality management device 1 via electrical communication means or measurement values are manually input into the water quality management device 1, whereby the various measurement values (ammonia concentration, hydrogen ion concentration (pH), oxidation-reduction potential (ORP), electrical conductivity (EC) and dissolved oxygen concentration (DO)) related to water quality, which are the measurement results of the external sensors 11 to 15, are stored in the memory unit 2. The determination unit 3 calculates a future predicted value based on fluctuations in the measurement values stored in the memory unit 2 and determines the time when the predicted value will exceed a reference value representing water quality deterioration. The display unit 4 displays the time when the reference value will be exceeded, the time when replacement of water of the pond is necessary, based on the determination results of the determination unit 3.

Various aquaculture pond management equipment 21 to 25 are installed around the aquaculture pond. The aquaculture pond management equipment 21 to 25 includes a pH sensor 21 for measuring the pH of water supplied to the pond, a water supply valve 22 for supplying water to the pond, an oxygen dissolver 23 for increasing the dissolved oxygen concentration in the pond, air instruction/alarm device 24 for giving instructions and alarms based on the state of the pond, and an aeration water wheel 25 for blowing air. Each of these management equipment is an example, appropriate equipment can be added to each aquaculture pond, and equipment can be omitted. Each of these aquaculture pond management equipment 21 to 25 can be centrally managed and controlled by the water quality management device 1, or can be manually operated based on the display of the display unit 4 or the like. Note that in the descriptions of the embodiments below, eel is adopted as an example of a firmed fish, but the present invention is not limited to eels.

Prior to detailed description of the embodiments, first, aquaculture pond water quality management will be described.

Figure 2:
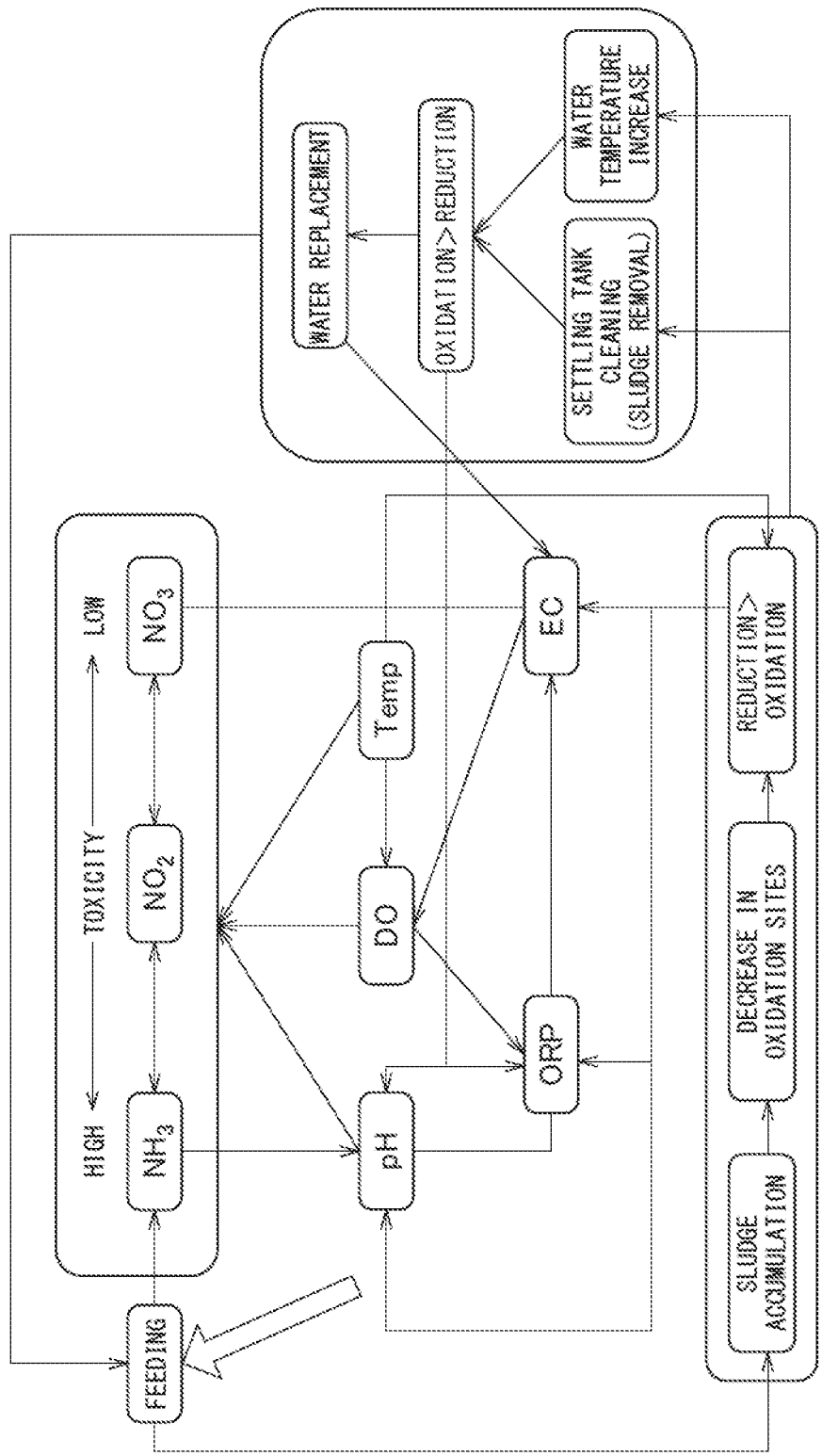
FIG. 2 is a schematic diagram showing causes of water quality changes in an aquaculture pond and the mutual relationships thereof, which is the premise of the present invention.

FIG. 2 is a schematic diagram showing causes of water quality changes of an aquaculture pond and the mutual relationships thereof. This is a compilation based on the experience of breeding farmed fish by the inventor hi FIG. 2, pH is hydrogen ion concentration, DO is dissolved oxygen concentration, Temp is water temperature, ORP is oxidation-reduction potential, and EC is electrical conductivity. The following description is based on FIG. 2.

In aquaculture ponds, fish excrement is decomposed by microorganisms, which generates ammonia. Ammonia ($NH_3$) is oxidized by the nitrification reaction of filtering bacteria (nitrifying bacteria), changes to less toxic nitrous acid ($NO_2$), and further changes from nitrous acid ($NO_2$) to less toxic nitric acid ($NO_3$). However, when farmed fish are bred for long period of times, sludge accumulates in the pond and the nitrification reaction decreases. The pH drops due to the oxidative decomposition of ammonia, and the generation of nitric acid, which is the product, causes an increase in electrical conductivity. Oxygen is required for this oxidative decomposition of ammonia, and the higher the temperature, the higher the activity of the nitrifying bacteria. Conversely, when the reduction reaction becomes stronger than the oxidation reaction due to the accumulation of sludge, the reduction reaction of nitric acid occurs, the pH increases, and the electrical conductivity decreases. At this time, the oxidation-reduction potential (ORP) of the water in the aquaculture pond decreases. Based on such knowledge, it is possible to grasp the state of the pond based on the oxidation-reduction potential (ORP) and pH in pond management operations for the purpose of recovering the state of the pond, such as cleaning the sludge. However, when the pH is low (5.5 or less) in the presence of sufficient oxygen and in a state in which there is a reaction field and ammonia, the activity of nitrifying bacteria is reduced and the oxidation-reduction potential (ORP) becomes extremely high.

Figure 3:
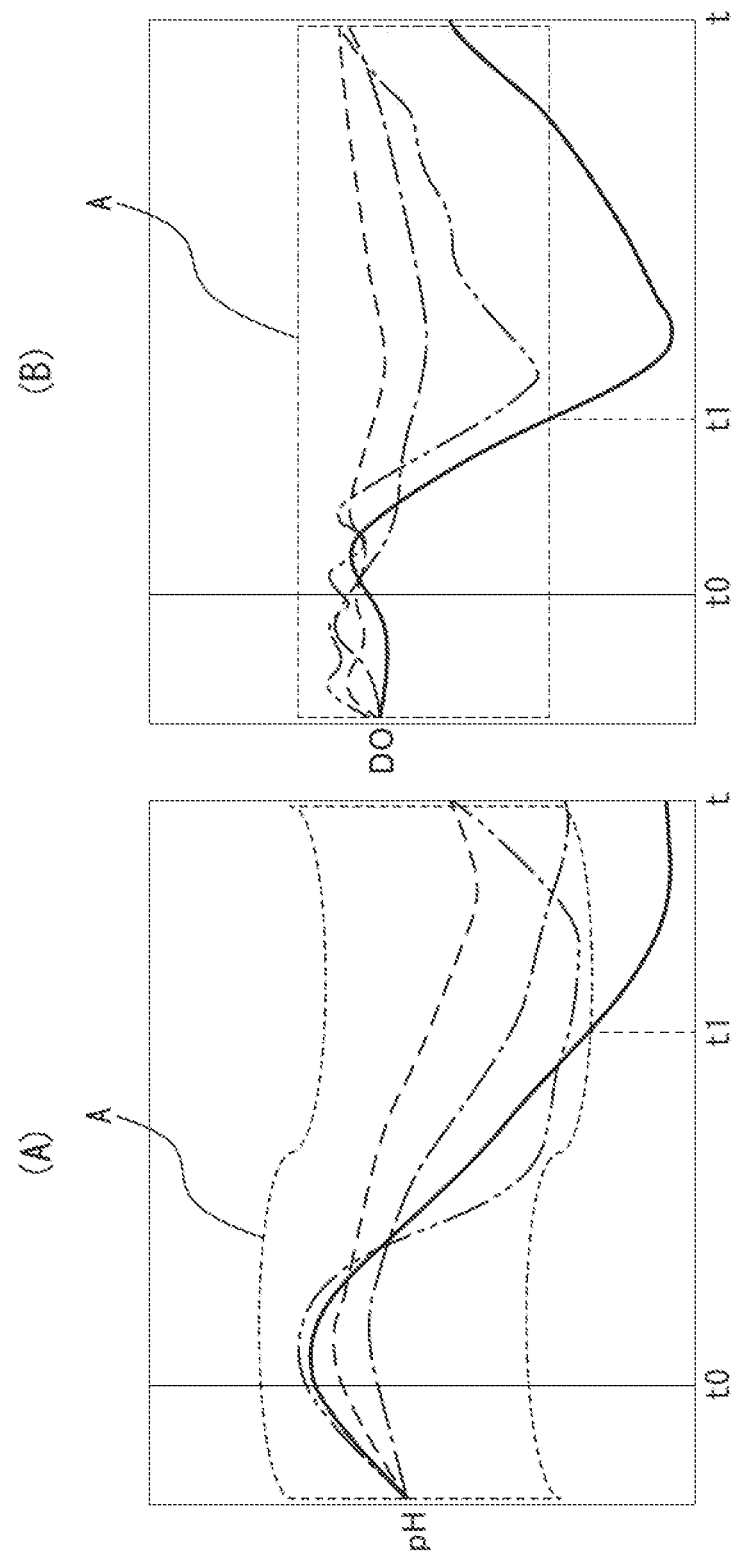
FIG. 3 shows graphs illustrating fluctuation& in pH and DO (dissolved oxygen concentration) after feeding.

FIGS. 3(A) and (B) are graphs showing pH and DO (dissolved oxygen concentration) fluctuations after feeding. As is clear from the graphs, pH and DO fluctuate along with the passage of time t from feeding t0. Though the inside of the broken line in the graph is the range A where the fluctuations were permissible, there is a time (t>t1) at which the fluctuations exceed that range. Therefore, the water quality fluctuations in one day are also an important factor in managing aquaculture pond. If the feeding amount is not appropriate, the pH will drop excessively or the DO will drop excessively, which will cause a burden on the firmed fish and increase the risk of illness. Thus, by confirming the fluctuations of the condition of the pond after feeding for several days, it is possible to grasp the guideline of the optimum feeding amount, and when the DO is reduced, the output of the oxygen dissolver 23 can be increased, and the pH adjuster can be used in advance. In this manner, by collecting and analyzing data on the amount of feed and water quality, it becomes possible to digitize the know-how that was conventionally performed by the intuition and experience of a craftsman.

In eel farming, the "nitrite breeding method" and "ammonia breeding method" are known. These breeding methods differ in the aquaculture pond equipment (size of settling tank, presence or absence of gavel), breeding period (40 to 50 days or 90 to 120 days), feeding method (number of feedings per day), and the characteristics of water quality (allowable range of nitrite concentration or ammonia concentration) are also different. Thus, each of these known breeding methods has a different tendency of measurement value fluctuations by various eternal sensors. Furthermore, the predicted fluctuation tendency and the reference value indicating the degradation of water quality are also different depending on the breeding method.

FIG. 4 shows graphs illustrating pH fluctuations and ammonia concentration fluctuations based on actual breeding results, where (A) is a graph by the nitrite breeding method and (B) is a graph by the ammonia breeding method. t0, which is the origin of the graph, is the start time of breeding, and time txx is the water change time, since the water quality has deteriorated. After cleaning the pond, breeding will start from t1 (t0–t1<tx; t1 is not shown). In these graphs, for example, measurement by the sensor is set to once a day before feeding, and single-day fluctuations are excluded. Other than measurement once a clay by the sensor, an appropriate measurement method can be adopted, such as measuring a plurality of times at a fixed time and adopting an average value.

As described above, the method of water quality management differs between the nitrite breeding method and the ammonia breeding method. For example, in the nitrite breeding method, the pH is adjusted by adding calcium carbonate, as described later (refer to point C in FIG. 4A), whereas in the ammonia breeding method, the pH is not adjusted. However, it can be seen from the graphs (A) and (B) in FIG. 4 that in both of the breeding methods, the pH increased with the passage of time, at the water replacement time txx, ammonia concentration reached the reference value XX, which indicates the degradation of water quality, and the feeding amount decreased before reaching time txx. Inn this manner, regardless of the breeding method, the future water quality can be predicted from the fluctuation tendency of pH or the fluctuation tendency of ammonia concentration, for example, based on comparison with the accumulated past data, and it is possible to predict the replacement time of the water in the pond. Examples based on the fluctuation tendency of pH or ammonia concentration will be described in Examples 1 and 2 below.

Regarding the prediction of future water quality fluctuations, for example, known analytical means including statistical methods can be adopted, such as making predictions based on approximate curves and regression lines of graphs using the function feature of spreadsheet software. Furthermore, it is possible to accumulate past breeding results as data and make a determination referring to this data, and it is possible to set a reference value as a reference for determining, the tendency of water quality deterioration based on this data. Further, regarding the prediction of water quality fluctuations, in addition to predicting the time at which the predicted value will reach the reference value, the slope of the fluctuation tendency of the predicted value with respect to the time axis, i.e., the time when the unit time fluctuation rate of the predicted value is greater than or less than a predetermined value, can be predicted, which can be determined as the time when the replacement of the water in the pond is necessary.

EXAMPLES

Example 1

In Example 1, changes in ammonia concentration are monitored for a predetermined period of time (daily), and it is predicted that the concentration will reach a predetermined value from the transition so far, and replacement of the water (the limit life of the pond) is notified in advance. For example, by using analytical means, it is possible to predict the time txx when the ammonia concentration reaches the reference value XX, representing the degradation of water quality, based on the rate of increase of the ammonia concentration at the time tx when advance notice is given.

Specifically, as is clear from the ammonia concentration fluctuations of FIG. 4, the ammonia concentration was low since the start of the breeding period, and it is not possible to predict the water replacement time during this period. However, if the ammonia concentration begins to rise, it is possible to predict from the rising trend thereof the time txx when the ammonia concentration will reach the reference value XX, which represents the degradation of water quality, at the time tx. Since it is not possible to make a very accurate prediction at the stage in which the increase in ammonia concentration begins, the time tx at which advance notice should be given may be, for example, after the time when the ammonia concentration exceeds XX/3 (one-third of the reference value XX). The increase in ammonia between time tx and time txx is due to a decrease in the oxidation reaction (pH 5.5 or less, temperature decrease, oxygen deficiency, carbonate-ion deficiency) and an increase in the reduction reaction (sludge accumulation, anaerobic state). Since the water quality management device 1 notifies in advance the time txx when the ammonia concentration rises and will exceed the reference value XX, the operator can determine that it is necessary to improve the decrease in the oxidation reaction and the increase in the reduction reaction, and advance notice can more accurately be given as the advance notice time tx approaches the time txx, whereby the operator will be able to start water replacement before reaching the time txx, in addition to working to improve the pond environment. Since the ammonia concentration also increases with an increase in the feeding amount, it is necessary to make corrections based on the feeding amount, and it is necessary to judge whether or not the current ammonia concentration corresponds to the reference value. The water quality management device 1 can also make corrections based on the feeding amount by storing data on the feeding amount.

Example 2

In Example 2, changes in pH are monitored on a daily basis, it is predicted when the value thereof will each the predetermined value, and the water replacement time txx is notified in advance. Like the reference value XX at which the ammonia concentration indicates the degradation of the water quality in Example 1, the time txx when the pH will reach the reference value can be predicted and notified in advance. If the predicted value of pH tends to decrease during the breeding period before the water quality of the aquaculture pond deteriorates, the water quality management device 1 can display an instruction to add a pH adjuster (calcium carbonate, baking soda, etc.), and if there is an increasing tendency, can display an instruction to replace the water and remove deposits. As described above, in the nitrite breeding method, calcium carbonate is put into the pond at the point C of the pH fluctuations in FIG. 4A to adjust the pH. In this manner, it is not possible to predict the water replacement time when the pH fluctuates between peaks and valleys due to the pH adjustment. Therefore, the water quality management device 1 can be set so as not to predict the time at which the water quality deteriorates at the time when there are peaks and valleys.

Example 3

In Example 3, changes in ORP are monitored for a predetermined period of time (daily), and when a decrease in the numerical value thereof is continuously detected, it is notified that the oxidizing capacity of the pond is decreasing, i.e., water replacement time (limit life of the pond) is approaching. When the ORP exceeds 300 mV, the pH is 5.5 or less and there is a high possibility that the oxidation reaction is unlikely to occur, whereby a pH adjuster should be added.

Figure 5:
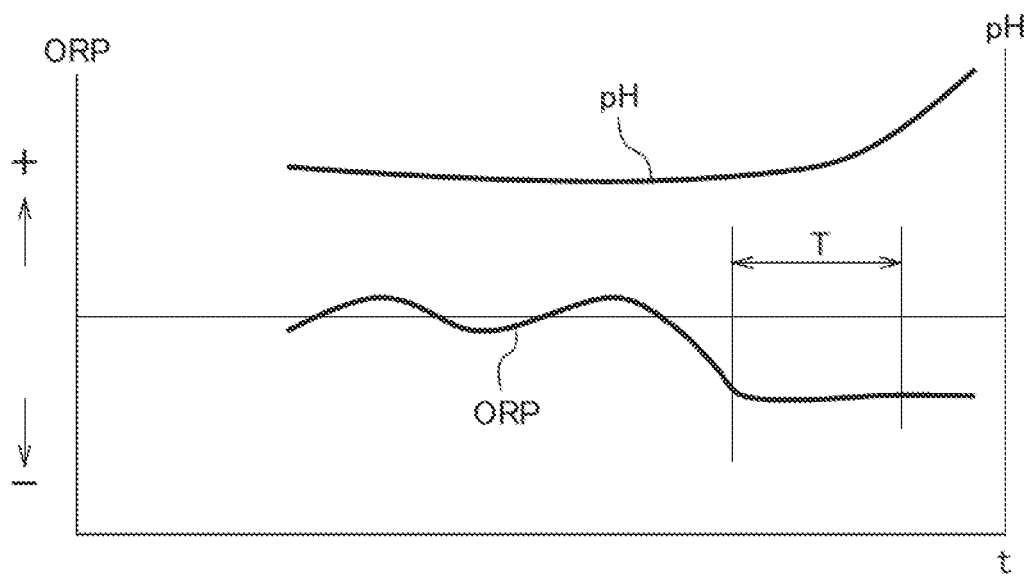
FIG. 5 is a graph showing fluctuations in pH and fluctuations in ORP (oxidation-reduction potential) in relation to Example 3 of the present invention.

In relation to Example 3, FIG. 5 is a graph showing fluctuations in pH and fluctuations in ORP (oxidation-reduction potential). As is clear from FIG. 5, ORP repeatedly fluctuates between positive and negative, after which the pH tends to rise after a period T in which the ORP remains negative and aquaculture continues. Since this state indicates that the end of life of the aquaculture pond is approaching, the water replacement time of the pond can be predicted by monitoring the ORP and detecting the period T dining which the negative state of the ORP continues. Though it is possible to predict the replacement time of water in the pond from only the measurement value of ORP based on the accumulated past data, as mentioned above, it is also possible to make a more accurate prediction by combining other measurement values.

Example 4

Figure 6:
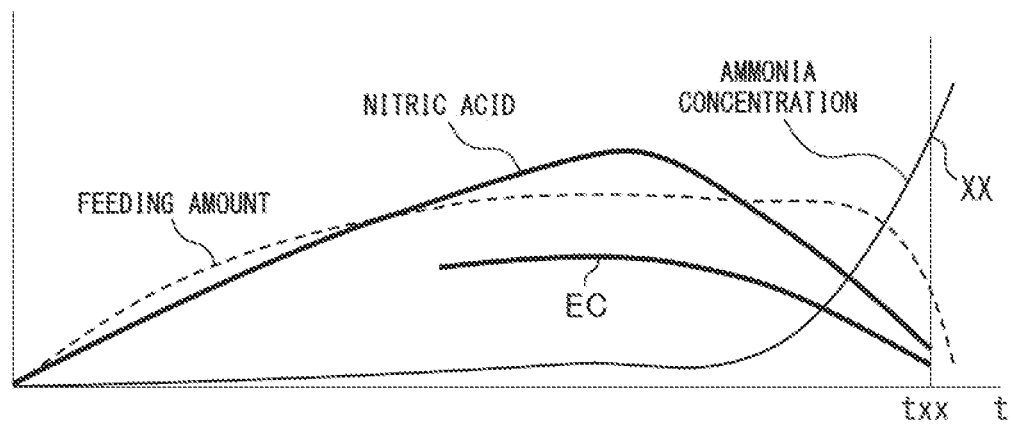
FIG. 6 is a graph showing EC (electrical conductivity) fluctuation tendency and water replacement time in relation to Example 4 of the present invention.

In Example 4, changes in EC (electrical conductivity) are monitored for a predetermined period of time, it is predicted that the value thereof will reach a predetermined value when the value is on a downward trend from the amount of decrease and change, and replacement of the water (the limit life of the pond) is notified in advance. In relation to Example 4, FIG. 6 is a graph showing the fluctuation tendency of EC (electrical conductivity) and the water replacement time. As shown in FIG. 6, in the case of the general ammonia breeding method, it is known that when the nitric acid concentration decreases, the ammonia concentration increases thereafter and the condition of the pond deteriorates. In this manner, since there is a correlation between nitric acid concentration and EC, by monitoring changes in EC and predicting the time txx when the rate of decrease in EC, i.e., the slope (negative slope) of the change in EC with respect to the elapsed time, is less than or equal to a predetermined value (greater than or equal to a predetermined value in terms of an absolute value) instead of predicting the time txx when the ammonia concentration will reach XX, the water replacement time can be notified in advance. Furthermore, the water quality management device 1 can make a more accurate prediction by adding other factors such as the feeding amount in addition to analysis based on the accumulated past data.

Prior to describing Example 5, the daily management of farmed fish breeding will be explained based on the case of eel farming. Examples of daily management of farmed fish breeding include the following items.

- An aeration turbine 25 is driven when the dissolved oxygen concentration does not reach a predetermined value even after driving the oxygen dissolver 23.
- The water supply valve 22 is operated to supply water when the pH drops sharply.
- Instruction to add calcium carbonate when the pH drops sharply
- The decomposition capacity of ammonia decreases when the pH is lower than 5.5, so it controlled so as to exceed 5.5.

As described above, dissolved oxygen concentration is an important index in the daily management of breeding.

Figure 7:
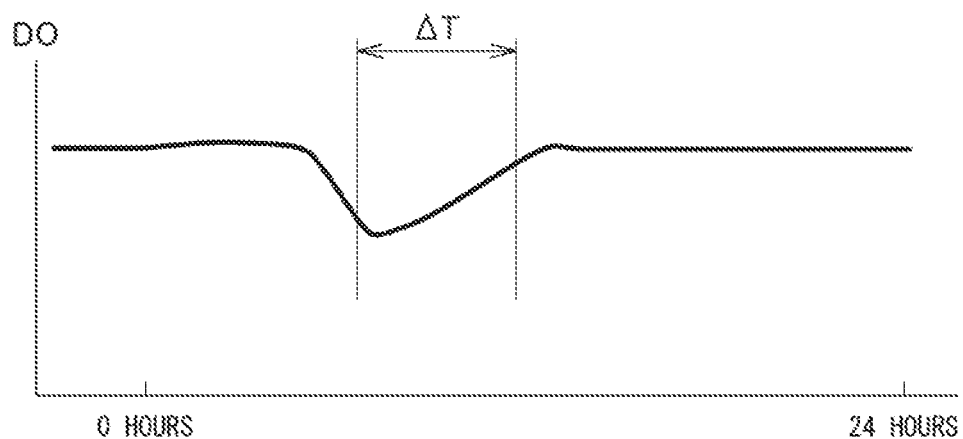
FIG. 7 is a graph showing dissolved oxygen concentration control in daily management of farmed fish in relation to Example 5 of the present invention.

FIG. 7 is a graph showing dissolved oxygen concentration control in the daily management of farmed fish.

First, as a daily management, when the dissolved oxygen concentration (DO) drops sharply, prey are often active, and in this case, it is necessary to increase the oxygen supply amount. Since a sharp decrease in dissolved oxygen concentration may lead to the death of a large number of farmed fish, it is necessary to prevent decreases in dissolved oxygen concentration. As shown in FIG. 7, when the oxygen suddenly decreases, the oxygen dissolver 23 is driven for ΔT time to control the dissolved oxygen concentration so as to increase. If the dissolved oxygen concentration does not reach a predetermined value even after driving of the oxygen dissolver 23, the aeration turbine 25 is driven.

Example 5

In Example 5, changes in dissolved oxygen concentration (DO) are monitored for a predetermined period of time, and notification is performed when the reduction rate of DO is lower than a predetermined value, for example, when it becomes Δ1 ppm/hr or more. The water quality management device 1 can be set to notify not only when the DO is lower than the predetermined value but also when the DO approaches the predetermined value or the DO is in a state of lowering for 30 minutes or more.

In the descriptions above, Examples 1 to 5 were described using eel as an example. Though it is possible to determine the time when replacement of the water in the pond is necessary from only the measurement value by one external sensor, as described in each Example, it is also possible to make a more accurate determination based on the measurement values of two or more sensors. Further, it is also possible to make a determination by adding data related to breeding such as the feeding amount.

Note that the technical scope of the present invention is not limited to the embodiments described above, and the addition of various changes to the embodiments described above can be included as long as they do not deviate from the spirit of the present invention. Specifically, the specific features given in the embodiments are merely exemplary and can be appropriately changed.

INDUSTRIAL APPLICABILITY

The water quality management device of the aqua, culture pond according to the present invention is not limited to eels, but can be applied to various farmed fish such as rainbow trout and carp and shellfish such as shrimp and other shellfish.

REFERENCE SIGNS LIST

1 water quality management device
2 memory unit
3 determination unit
4 display unit
11 to 15 external sensor
21 to 25 aquaculture pond management equipment

The invention claimed is:
1. An eel aquaculture pond water quality management system, comprising:
   two or more external sensors installed in an aquaculture pond, a memory unit which stores measurement values related to water quality measured at appropriate time intervals by the two or more external sensors and data related to feeding amount, a determination unit which calculates a future predicted value based on fluctuations in the measurement values, by using approximate curves or regression lines, and determines a time when the predicted value will exceed a reference value indicating a deterioration in water quality, wherein the reference value is a threshold value when replacement of water of the pond is necessary due to the deterioration in water quality, and a display unit which displays the time when the reference value will be exceeded, wherein the two or more external sensors comprise at least an ammonia sensor and a pH sensor, and the measurement values related to water quality comprise a measurement value of ammonia concentration and a measurement value of hydrogen ion concentration (pH), wherein the determination unit corrects the measurement value of ammonia concentration based on the data related to feeding amount, and when the corrected measurement value of ammonia concentration and the measurement value of hydrogen ion concentration (pH) are in a rising trend after the time when the corrected measurement value of ammonia concentration exceeds one-third of the reference value, the determination unit determines a time when the predicted value of ammonia concentration reaches the threshold value when replacement of water of the pond is necessary, and the water quality management system further includes one or more of an oxygen dissolver that is operated to change the amount of oxygen dissolved in the water of the pond based on a determination made by the determination unit, an aeration turbine that is driven to change the amount of oxygen dissolved in the pond based on a determination made by the determination unit, a water supply valve that is operated to supply water to the pond based on a determination made by the determination unit, and a pH adjuster that is added to the water in the pond for adjustment of the pH of the water in the pond based on a determination made by the determination unit.

2. The eel aquaculture pond water quality management system according to claim 1, wherein measurement by the two or more external sensors is performed once daily at a fixed time.

3. The eel aquaculture pond water quality management system according to claim 1, wherein the two or more external sensors are three or more external sensors, and further comprise an oxidation reduction potentiometer and the measurement value comprises oxidation-reduction potential (ORP).

4. The eel aquaculture pond water quality management system according to claim 1, wherein the two or more external sensors are three or more external sensors, and further comprise an electrical conductivity meter and the measurement value comprises electrical conductivity (EC).

5. The eel aquaculture pond water quality management system according to claim 1, wherein the two or more external sensors are three or more external sensors, and further comprise a dissolved oxygen concentration sensor and the measurement value comprises dissolved oxygen concentration (DO).

6. An eel aquaculture pond water quality management method, comprising the steps of:

storing measurement values related to water quality measured at appropriate time intervals by two or more external sensors installed in an aquaculture pond in a memory unit, storing data related to feeding amount, calculating, by a determination unit, a future predicted value based on fluctuations in the measurement values, by using approximate curves or regression lines, and determining a time when the predicted value will exceed a reference value indicating a deterioration in water quality, wherein the reference value is a threshold value when replacement of water of the pond is necessary due to the deterioration in water quality, displaying the time when the reference value will be exceeded on a display unit, wherein the two or more external sensors comprise at least an ammonia sensor and a pH sensor, and the measurement values related to water quality comprise a measurement value of ammonia concentration and a measurement value of hydrogen ion concentration (pH), and wherein the determination unit corrects the measurement value of ammonia concentration based on the data related to feeding amount, and when the corrected measurement value of ammonia concentration and the measurement value of hydrogen ion concentration (pH) are in a rising trend after the time when the corrected measurement value of ammonia concentration exceeds one-third of the reference value, the determination unit determines a time when the predicted value of ammonia concentration reaches the threshold value when replacement of water of the pond is necessary, and the water quality management method further includes one or more of operating an oxygen dissolver to change the amount of oxygen dissolved in the water of the pond based on a determination made by the determination unit, driving an aeration turbine to change the amount of oxygen dissolved in the pond based on a determination made by the determination unit, operating a water supply valve to supply water to the pond based on a determination made by the determination unit, and adding a pH adjuster to the water in the pond for adjustment of the pH of the water in the pond based on a determination made by the determination unit.

* * * * *